No. 12,164. REISSUED OCT. 27, 1903.
F., R. & O. KAMPFE.
MACHINE FOR STROPPING RAZOR BLADES.
APPLICATION FILED MAY 6, 1903.
Fig. 1.
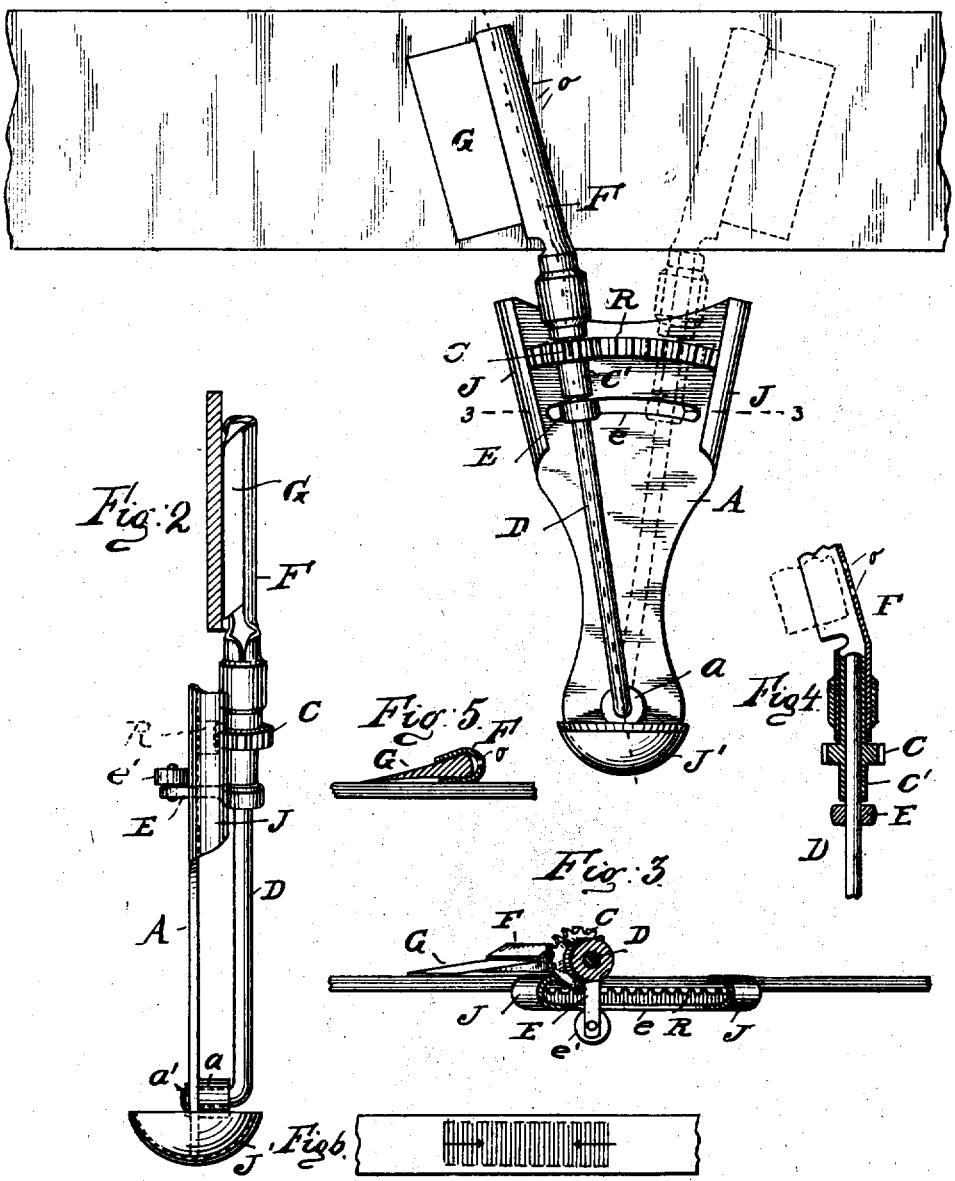
Fig. 6.
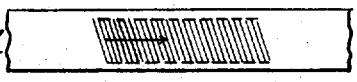
Fig. 7.
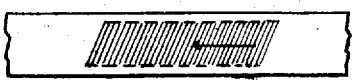
Fig. 8.
WITNESSES:
T. Stallman
J. Ow. Riemann.
INVENTORS
F. Kampfe
R. Kampfe
O. Kampfe
BY Oscar F. Gunz
Their ATTORNEY.

No. 12,164.

Reissued October 27, 1903.

UNITED STATES PATENT OFFICE.

FREDERICK KAMPFE, RICHARD KAMPFE, AND OTTO KAMPFE, OF NEW YORK, N. Y.

MACHINE FOR STROPPING RAZOR-BLADES.

SPECIFICATION forming part of Reissued Letters Patent No. 12,164, dated October 27, 1903.

Original No. 712,384, dated October 28, 1902. Application for reissue filed May 6, 1903. Serial No. 155,951.

*To all whom it may concern:*

Be it known that we, FREDERICK KAMPFE, RICHARD KAMPFE, and OTTO KAMPFE, citizens of the United States, residing in New York city, in the borough of Brooklyn, county of Kings, and State of New York, have invented certain new and useful Improvements in Machines for Stropping Razor-Blades, (for which Letters Patent of the United States No. 712,384 were granted to us on the 28th day of October, 1902, and which are surrendered for reissue,) of which the following is a specification.

This invention relates to improvements in machines for stropping razor-blades, and is particularly well adapted for use on machines of the general type shown and described in United States Letters Patent No. 658,649, heretofore granted to us on or about the 25th day of September, 1900. The particular form of machine of this type which is shown in the said prior Letters Patent comprises a blade-holder movably connected to a device adapted to be held in the hand of the user and free to rotate with regard to said device as the same is moved up and down longitudinally of the strop. The device adapted to be held in the hand may be of any suitable shape and construction, but preferably will comprise a handle-frame, a pivot-rod fulcrumed at its inner end to said frame, a pinion on said pivot-rod, a rack, preferably segmental, arranged on said frame and beneath said pinion, and means for holding said rack and pinion constantly in engagement and with as little friction as possible. When this form of device to be held in the hand is employed, the said pivot-rod will be the means of connection between the said device and the blade-holder. Irrespective, however, of what means are used for connecting the blade-holder to the device to be held in the hand it will be found most advantageous to arrange the said blade-holder at an obtuse angle of inclination to the horizontal axis of said connecting means, such as a connecting-rod, pivoted or otherwise. Such an arrangement maintains the cutting edge of the blade at an inclination to the strop without changing the position of the handle or device held in the hand toward said strop. It also, by producing a constantly-increasing eccentricity, tends to rotate, oscillate, or turn over said blade-holder whenever one starts to reverse or move the same along the strop in the wrong direction or, in other words, with the cutting edge of the blade foremost. Whenever the holder is mounted free to rotate with regard to the handle-frame, handle, or device adapted to be held in the hand, this arrangement at an angle will cause an instantaneous rotary movement of the holder upon a reversal of the direction of movement of the same along the strop. As a result the cutting edge of the blade is always lifted away from and out of contact with the strop before it can cut into the same.

We will now describe the construction of our preferred form of machine for embodying our invention, which form is also illustrated in the accompanying drawings, and will then point out the novel features of our invention in claims.

In the accompanying drawings, Figure 1 is a plan view of our improved stropping-machine, shown with the blade applied flat to the strop. Fig. 2 is a side elevation, partly in section, through the strop. Fig. 3 is a vertical transverse section on line 3 3, Fig. 1. Fig. 4 is a detail vertical section showing the connection of the blade-holder and pivot-rod. Fig. 5 is a vertical transverse section through the blade-holder and blade. Fig. 6 is a diagram illustrating the action of an ordinary reciprocating stropping device, and Figs. 7 and 8 are diagrams illustrating the action of our improved stropping device.

Similar letters of reference indicate corresponding parts.

Referring to the drawings, A represents a sector-shaped handle-frame, which is provided on its face at a short distance from its edge with a segmental rack R, engaging a pinion C, that is mounted on a sleeve C′, which is placed loosely on the free end of a rod D, so as to turn axially thereon. The opposite end of the rod D is pivoted to the opposite end of the handle-frame A concentric with the rack R in such a manner that the rod D can swing over the frame A. The rod D is preferably bent up at right angles at its pivoted end and fitted into a socket *a* of the handle-frame, the end of the pivot being upset and a washer $a'$ interposed between it and the under side of the handle-frame A and said end, as shown clearly in Fig. 2.

The pivot-rod D is provided adjacent the sleeve C' of the pinion C with a stationary arm E, that extends in downward direction through a segmental slot $e$, concentric with the rack R in the handle-frame A, to the under side of the same, said arm being provided at its lower end below the handle-frame with an antifriction-roller $e'$, so that the pivot-rod D can move freely from one side of the handle-frame to the other, while it prevents the rod D from moving away from the frame A by keeping the pinion C in engagement with the rack R at all times in opposition to the pressure exerted on the same during the stropping of the blade, which would tend to disengage the pinion from the rack.

To the sleeve C' is applied the socket of the blade-holder F, which is of substantially U shape in cross-section and adapted to receive the back of the blade G. The back of the blade-holder F is provided with a series of openings $o$ for the purpose of increasing its resiliency and facilitating the insertion and removal of the blade.

For facilitating the handling of the device a convex bent-up finger-rest J is attached to each side of the frame A, near the segmental end of the same, and a button-shaped rest J' for the palm of the hand to the opposite end of the frame near the pivot of the rod D, as shown clearly in Fig. 1.

The blade-holder is not placed in line with the axis of the pivot-rod D, but at an obtuse angle of inclination thereto. This serves for the purpose of facilitating the oscillations of the blade in either direction, following the motion of the oscillating handle-frame as soon as pressure is exerted on the back of the blade-holder when the same is lying on the strop. By the obtuse angle of inclination given to the blade-holder toward the pivot-rod D the sliding of the blade-holder and blade over toward the grain of the strop and the consequent cutting or injuring of the strop by the edge of the blade is prevented and the instant turning of the blade-holder following the motion of the handle-frame on the strop is produced.

The stropping operation with this preferred construction is performed in the usual manner by drawing the blade along the strop with the back of the blade-holder in front and then reversing the direction of movement, and so on. Immediately upon the said reversal of direction of movement the eccentric arrangement of the blade-holder, which is resting with its back upon the strop, causes the said holder to turn at least sufficiently to raise the cutting edge of the blade off the strop or, in other words, causes a rotary movement of the said blade-holder. Furthermore, as during the movement in either direction along the strop the pivot-rod in the construction shown has been swung to one extreme edge of the handle-frame so soon as the direction of movement is reversed the said pivot-rod should swing across the frame to the opposite edge thereof. As the pinion on said rod is in constant engagement with the rack on said handle-frame, whenever the pivot-rod swings to the opposite side of said frame the blade-holder will be rotated to the extent of one hundred and eighty degrees. The eccentricity produced by the arrangement of the blade-holder at an obtuse angle is by itself sufficient to rotate the blade-holder one hundred and eighty degrees, provided the blade-holder is mounted free to rotate. The combination of the two said arrangements of the swinging pivot-rod and the obtuse angle of inclination of the blade-holder to the handle or supporting or connecting rod, however, is a distinct improvement over either one by itself, as each assists the other in carrying out the desired results more rapidly and more efficiently.

Whatever may be the construction of the device to be held in the hand of the user or the means for connecting the blade-holder thereto if the said holder is arranged at an obtuse angle of inclination to the horizontal axis of the connecting means the resulting eccentricity invariably causes said holder to turn instantly upon the reversal of direction of movement of the device along the strop and whenever said direction is reversed and the holder is mounted so as to be free to rotate invariably causes an instantaneous rotary movement either together with or independently of the connecting-rod or other connecting or supporting means.

What we claim as new is—

1. In a razor-blade-stropping device, the combination of a blade-holder adapted to turn on its back and a rod extending from the inner end of said holder—the holder being arranged at a constant obtuse angle to the longitudinal axis of said rod.

2. In a razor-blade-stropping device, the combination of a blade-holder adapted to turn on its back and a rod extending from the inner end of said holder—the holder being movably connected thereto to rotate and arranged at a constant obtuse angle to the longitudinal axis thereof.

3. In a razor-blade-stropping device, the combination with a frame, of a blade-holder, and a rod connected to said holder and also movably connected to said frame, the said holder being rotatable in relation to the frame and arranged at a constant obtuse angle to the longitudinal axis of said rod.

4. In a razor-blade-stropping device, the combination with a handle-frame, of a stationary segmental rack on said frame, a rod pivoted to said frame concentric with the rack, a blade-holder mounted on said rod, a pinion on the shank of the blade-holder engaging with the rack, and a retaining-arm on the pivot-rod extending through a segmental slot of the handle-frame and provided with an antifriction-roller at the under side of the frame, substantially as set forth.

5. In a razor-blade-stropping device, the combination, with a handle-frame, of a finger-rest upon each side of the frame, a palm-rest button at the end of the frame, a segmental rack secured on said frame extending between the finger-rests, a rod pivoted on said frame concentric with the rack, a pinion on said rod engaging the rack, a blade-holder connected with said pinion, and a retaining-arm attached to the pivot-rod and extending through the slot of the handle-frame, said arm being provided with an antifriction-roller at its under side, substantially as set forth.

6. In a razor-blade-stropping device, the combination, with a handle-frame, of a stationary segmental rack on said frame, a rod pivoted to the handle-frame, a blade-holder connected with said pivot-rod, a sleeve connected with the blade-holder and provided with a pinion engaging said rack, and means for retaining the pinion in engagement with the rack, said blade-holder being arranged at an obtuse angle of inclination toward the axis of the pivot-rod, substantially as set forth.

7. In a machine for stropping razor-blades, the combination of a blade-holder and a pivot-rod connected therewith, said blade-holder being arranged at an obtuse angle of inclination to the axis of the pivot-rod, substantially as set forth.

In testimony whereof we have signed our names to the foregoing specification in the presence of two subscribing witnesses.

FREDERICK KAMPFE.
RICHARD KAMPFE.
OTTO KAMPFE.

Witnesses:
J. H. HOFFMANN,
CHAS. F. STEUERWALD.